US012712095B2

(12) United States Patent
Martinez et al.

(10) Patent No.: US 12,712,095 B2
(45) Date of Patent: Aug. 18, 2026

(54) STRUCTURES WITH INTEGRATED CONDUCTORS

(71) Applicant: Liquid Wire Inc., Portland, OR (US)

(72) Inventors: Jesse Michael Martinez, Milwaukie, OR (US); Michael Adventure Hopkins, Portland, OR (US); Charles J. Kinzel, Portland, OR (US); Trevor Antonio Rivera, Portland, OR (US); Mark William Ronay, Portland, OR (US); Edward Martin Godshalk, Newberg, OR (US)

(73) Assignee: Liquid Wire Inc., Portland, OR (US)

( * ) Notice: Subject to any disclaimer, the term of this patent is extended or adjusted under 35 U.S.C. 154(b) by 579 days.

(21) Appl. No.: 18/331,637

(22) Filed: Jun. 8, 2023

(65) Prior Publication Data

US 2023/0317314 A1 Oct. 5, 2023

Related U.S. Application Data

(63) Continuation of application No. 18/256,257, filed as application No. PCT/US2021/072863 on Dec. 10, 2021, now Pat. No. 12,580,095.

(Continued)

(51) Int. Cl.

*H01B 5/02* (2006.01)
*H01B 1/22* (2006.01)

(Continued)

(52) U.S. Cl.

CPC ................ *H01B 5/02* (2013.01); *H01B 1/22* (2013.01); *H01B 3/40* (2013.01); *H01B 3/48* (2013.01);

(Continued)

(58) Field of Classification Search

CPC ........ H01B 1/02; H01B 1/22; H01B 13/0036; H01B 19/04; H01B 3/40; H01B 3/48;

(Continued)

(56) References Cited

U.S. PATENT DOCUMENTS 5,756,405 A 5/1998 Appelt et al.
8,932,474 B1 1/2015 Cok (Continued)

FOREIGN PATENT DOCUMENTS

EP 3424053 A1 1/2019
JP 2005166502 A 6/2005

(Continued)

OTHER PUBLICATIONS

"International Application Serial No. PCT/US2021/072863, International Search Report mailed May 11, 2022", 4 pgs.

(Continued)

*Primary Examiner* — Timothy J Thompson
*Assistant Examiner* — Guillermo J Egoavil
(74) *Attorney, Agent, or Firm* — Quinn IP Law

(57) ABSTRACT

Systems, structures, and methods include a structure formed from a plurality of layers of matrix material. A bus is secured between adjacent layers of the plurality of layers of the matrix material. The bus includes a conductive gel configured to propagate an electrical signal through the structure.

20 Claims, 7 Drawing Sheets

Related U.S. Application Data

(60) Provisional application No. 63/124,705, filed on Dec. 11, 2020.

(51) Int. Cl.
*H01B 3/40* (2006.01)
*H01B 3/48* (2006.01)
*H01B 7/00* (2006.01)
*H01B 13/00* (2006.01)
*H01B 19/04* (2006.01)

(52) U.S. Cl.
CPC ....... *H01B 7/0027* (2013.01); *H01B 13/0036* (2013.01); *H01B 19/04* (2013.01)

(58) Field of Classification Search
CPC ...... H01B 5/02; H01B 7/0027; H05K 1/0272; H05K 1/0346; H05K 1/095; H05K 2201/0154; H05K 2201/10151
USPC .......................................................... 174/68.2
See application file for complete search history.

(56) References Cited

U.S. PATENT DOCUMENTS

| | | | | |
|---|---|---|---|---|
| 2002/0093104 | A1* | 7/2002 | Goldmann | H05K 3/3436<br>257/E23.067 |
| 2016/0343467 | A1 | 11/2016 | Wen et al. | |
| 2020/0137885 | A1 | 4/2020 | Flowers et al. | |

FOREIGN PATENT DOCUMENTS

| | | | | |
|---|---|---|---|---|
| JP | 2014093367 | A * | 5/2014 | Y02E 10/459 |
| JP | 2018089951 | A | 6/2018 | |
| WO | WO-2013044226 | A2 | 3/2013 | |
| WO | 2020041605 | A1 | 2/2020 | |
| WO | WO-2022051776 | A1 | 3/2022 | |
| WO | WO-2022126135 | A1 | 6/2022 | |

OTHER PUBLICATIONS

"International Application Serial No. PCT/US2021/072863, Written Opinion mailed May 11, 2022", 5 pgs.

* cited by examiner

STRUCTURES WITH INTEGRATED CONDUCTORS

CLAIM OF PRIORITY

This patent application is a continuation of U.S. patent application Ser. No. 18/256,257, filed Jun. 7, 2023, which is a U.S. National Stage Filing under 36 U.S.C. 371 from International Application No. PCT/US2021/072863, filed on Dec. 10, 2021, and published as WO 2022/126135, which claims the benefit of priority to U.S. Provisional Application Ser. No. 63/124,705, filed Dec. 11, 2020, each of which are incorporated by reference herein in their entirety.

TECHNICAL FIELD

The subject matter disclosed herein generally relates to structures having integrated conductors, circuits and/or sensors, and methods for making such structures.

BACKGROUND

Structures utilized in the aerospace, automotive, marine, consumer product and construction industries may be part of a system or assembly that includes electrical or electronic components. Typically, such structures and electrical or electronic components are formed separately but may be assembled or attached together.

Many such structures are made of composite materials. Composite materials are those produced from two or more constituent materials with dissimilar chemical or physical properties that, when merged, create a material with enhanced physical properties. The constituent materials remain separate and distinct within the final material that forms the structure.

DETAILED DESCRIPTION

Figure 1:
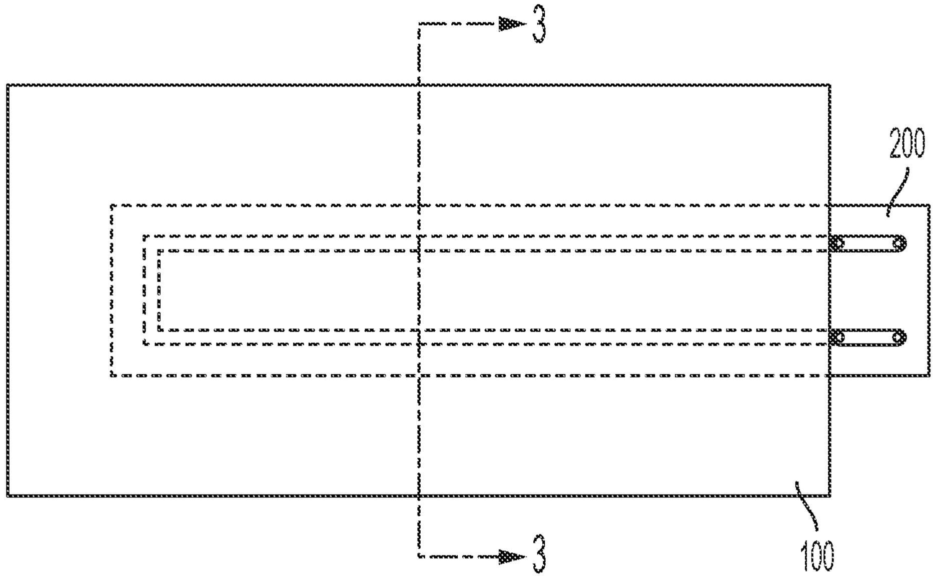
FIG. 1 is a system with a bus, in an example embodiment.

The embodiments and example implementation details described below are for purposes of illustration. The drawings are not necessarily shown to scale. The inventive principles are not limited to these embodiments and details.

Fiber-reinforced plastic (FRP) is a commonly employed composite material for aerospace, automotive, marine, consumer product and construction industries and comprises a polymer matrix reinforced with fibers. Fibers may include glass, carbon, aramid, basalt and the like. Polymers may include epoxy, vinyl ester, or polyester thermosetting plastics and the like.

Common examples of FRP manufacturing processes include molding one or more layers of reinforcement fibers impregnated with an uncured or partially cured plastic matrix and curing. Reinforcing fibers may be in filament, fabric and/or sheet form. The one or more layers of fibers may be pre-impregnated within the matrix, or the matrix may be impregnated amongst the fibers in situ during the molding operation. Other exemplary processes include dispersing fibers within an uncured matrix, molding the dispersion, and curing. There are many different molding and curing techniques and processes available that are known to one having ordinary skill in the art.

The nature of matrix materials means that such materials struggle, under conventional mechanisms, to support the inclusion of electronics or other materials within the resultant structures. Conventional wires or electronic conductors may be prone to breaking or otherwise being unreliable under the extreme environmental conditions of the curing process in particular. Consequently, such structures made from matrix materials typically include electronics, conductors, and the like on the outside of the structure, placed following curing. This exposes such electronics to environmental conditions, leading to potential unreliability, and reduces the capacity of sensors to accurately measure conditions within the structure.

A system has been developed that allows conductors and other electronics to be incorporated within structures formed from matrix materials. By forming a bus or carrier including conductive gel, the bus may be resilient against the environmental conditions of the curing process, meaning that the bus may be incorporated into the system, e.g., between layers of matrix material, before the curing process and thus be incorporated within the resultant structure physically rather than placed on the outside of the structure. Moreover, because the conductive gel is a fluid that can conform to any shape, the conductive gel doesn't need to bond to the matrix material to exist inside of the matrix material. As a result, the bus may be more protected against environmental conditions and, in the case of the bus being a sensor, more sensitive to conditions of the structure than a bus placed on an external surface of the structure while reducing the impact on the strength and resilience of the structure in comparison with conventional conductors.

FIG. 1 is a system 100 with a bus 200, in an example embodiment. In an example, the bus 200 is an integrated conductor. In the illustrated example, the bus 200 is a strain sensor configured to detect strain and/or other forces imparted on the system 100 generally by measuring changes in an electrical characteristic of a conductor of the bus 200, as disclosed in U.S. Pat. No. 10,672,530, filed Apr. 6, 2018, which is incorporated herein by reference in its entirety. However, in various examples, the bus 200 may be configured for any other suitable purpose, including but not limited to transmit electrical signals within or through the system 100.

The bus 200 may be formed from at least one layer comprising a deformable conductor, e.g., a fluid phase metal gel and optionally: a substrate layer; a stencil layer; and an insulation layer. The one or more layers may be form a stack. The stack of layers may comprise at least one pattern of traces and/or contact points and/or vias formed from a non-the deformable fluid phase conductive material. The pattern of conductive traces may be interconnected with the pattern of contact points and/or vias. A pattern of traces, vias, and contact points may be formed on or recessed into a surface of the substrate layer. One or more stencil layers may be supported by the substrate layer with a pattern of traces and/or contact points and/or vias extending through the entire thickness of the stencil layer. At least a portion of the stencil layer pattern may correspond to the substrate layer pattern. At least one insulation layer may be supported by the substrate and/or stencil layer. The insulation layer may and have a pattern of contact points and/or vias on or extending through a surface of the insulation layer. At least a portion of the insulation layer pattern may correspond the substrate and/or stencil layer pattern. The conductive material may be deposited to one or more layers of the stack. The various layers may be joined together to form the bus 200. The bus may comprise multiple stacks, and two or more stacks may be joined together. Vias and contact points from one stack may be in communication with vias and contact points from another stack thereby providing communication between the stacks. Vias may extend through combinations of one or more of the substrate, stencil and insulation layers of each stack to provide communication between the traces of the stacks. The bus 200 may optionally include an electric component, and/or a encapsulant covering at least a portion of vias, and/or contact points. The encapsulant may be formed from a similar or the same material as one or more of the layers of a layup or stack of bus 200.

The substrate, stencil, and insulation layers may include a flexible material. The layers may include a stretchable material. At least a portion of one of the layers may have an adhesive property. The layers may be joined together by the adhesive property.

The at least one electric device may include a surface mount component. The at least one electric device may include an integrated circuit in a package. The at least one electric device may be a resistor, a capacitor, a battery, or some other common electric devices used in circuit manufacturing. The at least one electric component may be attached to the circuit layup by the adhesive property of one of the layers, or may be attached to one of the layers by an adhesive.

Figure 2:
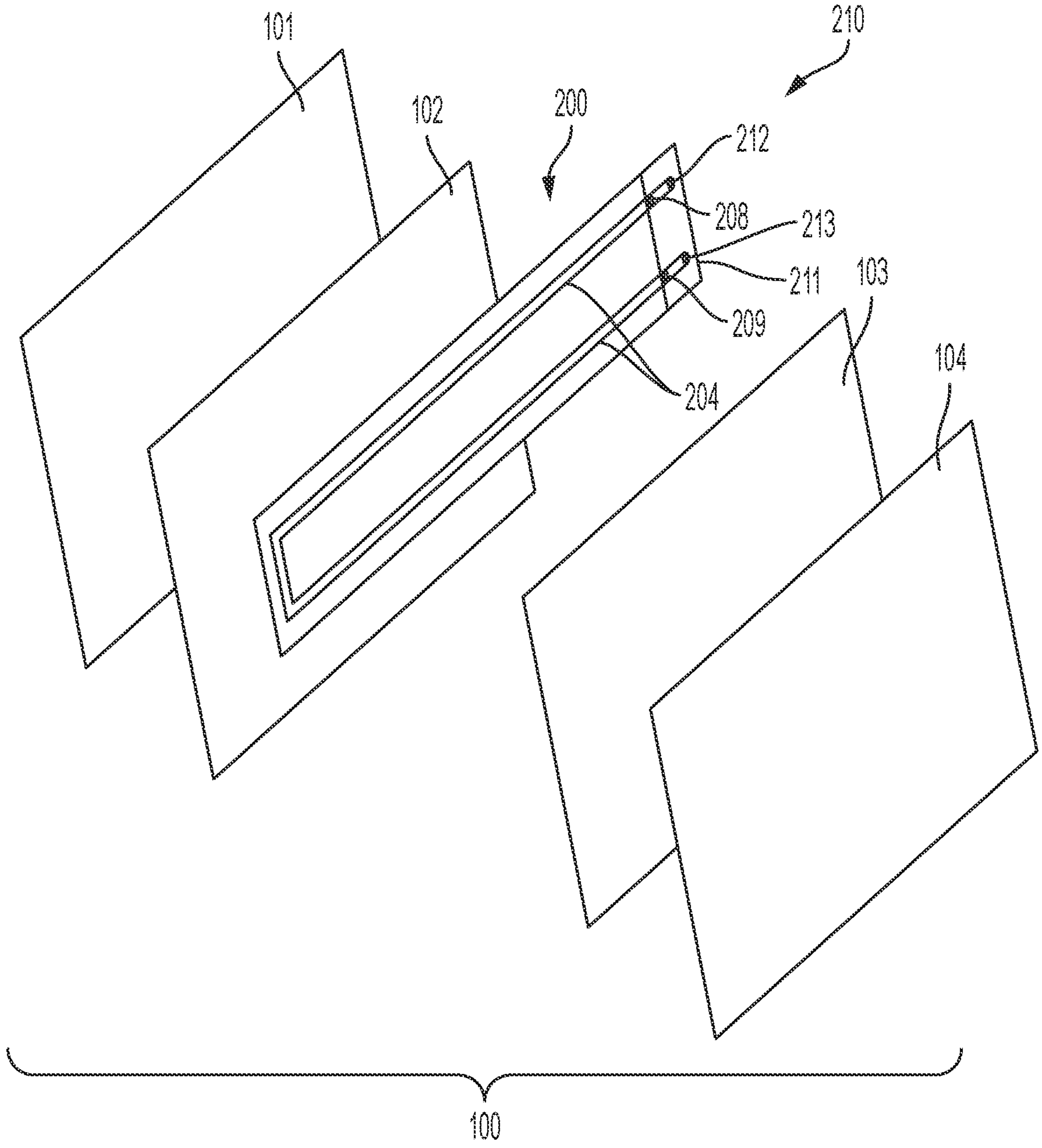
FIG. 2 is an exploded view of the system, in an example embodiment.

FIG. 2 is an exploded view of the system 100, in an example embodiment. In an example, the system 100 forms a stricture formed from four layers 101, 102, 103, 104. While four layers 101, 102, 103, 104 are illustrated by way of example it is to be recognized and understood that more or fewer layers may be utilized in any particular implementation of the system 100 as needed or appropriate to circumstances. In an example, the layers 101, 102, 103, 104 are formed of unidirectional carbon fiber reinforced prepreg composite sheet, each cut into the same rectangular shape. In an example, the layers 101, 102, 103, 104 are comprised of Grafil 34-700 having a thickness of 0.006" and an aerial weight of 232 g/m$^2$, impregnated with Newport 301 epoxy resin as the matrix material. However, while the above materials and dimensions are provided by way of example, it is to be recognized and understood that any suitable material may be utilized and that the principles disclosed herein may be applicable to any range of sizes for the layers 101, 102, 103, 104 and for the components of the system 100 generally.

In the illustrated example, the bus 200 is disposed or sandwiched between the layers 102 and 103, e.g., during the layup stage of a manufacturing process of the system 100, detailed below. A portion of sensor 200 is not sandwiched between layers 102, 103 but rather is allowed to be external to the system 100, e.g., so as to permit interconnectivity with another electrical component or another structure, (not shown). In various examples, the system 100 is made using processes and materials described in U.S. patent application Ser. No. 16/548,379 filed on Aug. 22, 2019, which is hereby incorporated by reference in its entirety. In such examples, the bus 200 may be made using a laminate structure from three layers.

In the illustrated example, and with reference to FIGS. 3A-D, an elongated U-shaped trace 204 is formed as an aperture in sheet 202 and a conductor 205 comprising a metal gel is deposited within the aperture. An optional electrical connector 210 comprising a polyimide board 211 and two copper contacts 212, 213 is attached to layer 203 such that each contact is electrically connected with one of the metal gel filled trace legs 206, 207. The ends of each of the legs are provided with a via 208, 209 extending through sheet 203 to enable the electrical connection between trace 204 and contacts 212,213.

FIGS. 3A-3D are sectional views of example implementations of the system 100. In an example, sheets 201 and 203 are approximately 0.003" and sheet 202 is approximately 0.0039" thick, for a total sensor thickness, in the regions where polyimide board 211 is absent, of 0.0099". Sheets 201, 203 may be a resilient partially cured (B-stage) thermoset resin film having an adhesive property and sheet 202 may be the same material as sheets 201, 203 or may be another material, e.g., a resilient thermoplastic polyurethane film. Therefore, sheet 202 may be adhered to sheet 201 by the self-adhesive nature of sheet 201. Similarly, sheet 202 and polyimide board 210 may be attached to sheet 203 by self-adhesion.

In the illustrated embodiments of FIGS. 1-3D, the system 100 is an example of a molded article. The sheets 201, 202, 203 of the bus 200 are examples of a first material, and the layers 101, 102, 103, 104 are examples of a second material. Owing to the physical properties of the sheets 201, 202, 203 in relation to the matrix material of the layers 101, 102, 103, 104, the material of the sheets 201, 202, 203 may flow with the layers 101, 102, 103, 104 during the curing process and, as a result, bond together, improving the incorporation of the bus 200 with the matrix material. Moreover, the principles disclosed with respect to matrix material may apply as well to any other material that may flow and bond with the material of the sheets 201, 202, 203 during a curing process. Thus, for instance, the same principles disclosed with respect to resin sheets and the matrix material of a fiber-reinforced laminate structure may be applied to systems which utilize, e.g., injection molded thermoplastic polyurethane (TPU) to form the structure of a bus 200 and a system 100.

Similarly, during manufacture of system 100, providing sheets 201, 203 having an adhesive property may be advantageous for holding sensor 200 in position for the remainder of the manufacturing steps, e.g., after being deposited or placed onto layer 102 or into/onto a mold. However, if desired, at any of the above described intermediate states, uncured sheets 201, 203 may be cured which may result in reduced adhesivity of the sheet material.

After sensor 200 is enclosed between layers 101, 102, 103, 104, the system 100 may be placed in a mold enclosed by a vacuum bag, vacuum may be applied, and the system 100 may be cured according to the matrix material manufacturer's instructions. e.g., in an oven at one hundred forty (140) degrees Celsius for one (1) hour. As a result of the ability of the bus 200 to stretch and bend and still provide reliable electrical performance, structures may be produced that have complex shapes or geometries with integrated conductors that take the shape of the resulting molded system 100.

Figure 3A:
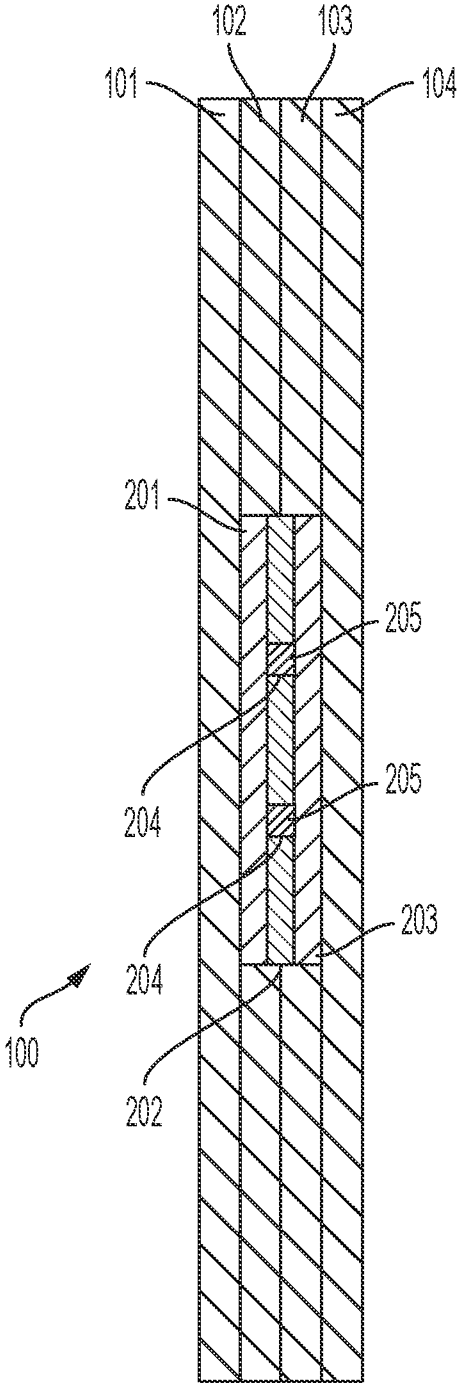
FIGS. 3A-3D are sectional views of example implementations of the system.

FIG. 3A is a depiction of the system 100 in which holes, indentations, or other type of displacement of the material of certain of the layers, in the illustrated examples layers 102 and 103, are formed to admit the bus 200. The layers 102, 103 may be formed in the illustration at the time of manufacture of the layers 102, 103 in the first instance or may be formed during the manufacture of the system 100 generally, e.g., by drilling, grinding, etc. an otherwise fully formed sheet.

Figure 3B:
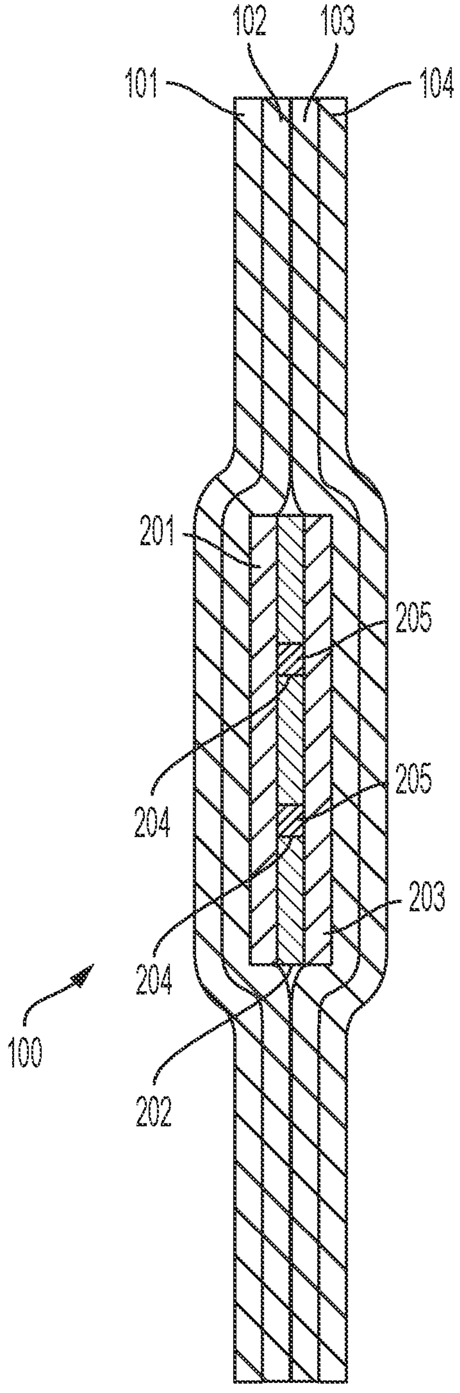

FIG. 3B is a depiction of the system 100 in which the layers 101, 102, 103, 104 are laid over the bus 200 without otherwise disrupting any of the sheets prior to curing the layers 101, 102, 103, 104. Consequently, the layers 101, 102, 103, 104 conform to the bus 200 which is left in a pocket formed between the layers 102, 103.

Figure 3C:
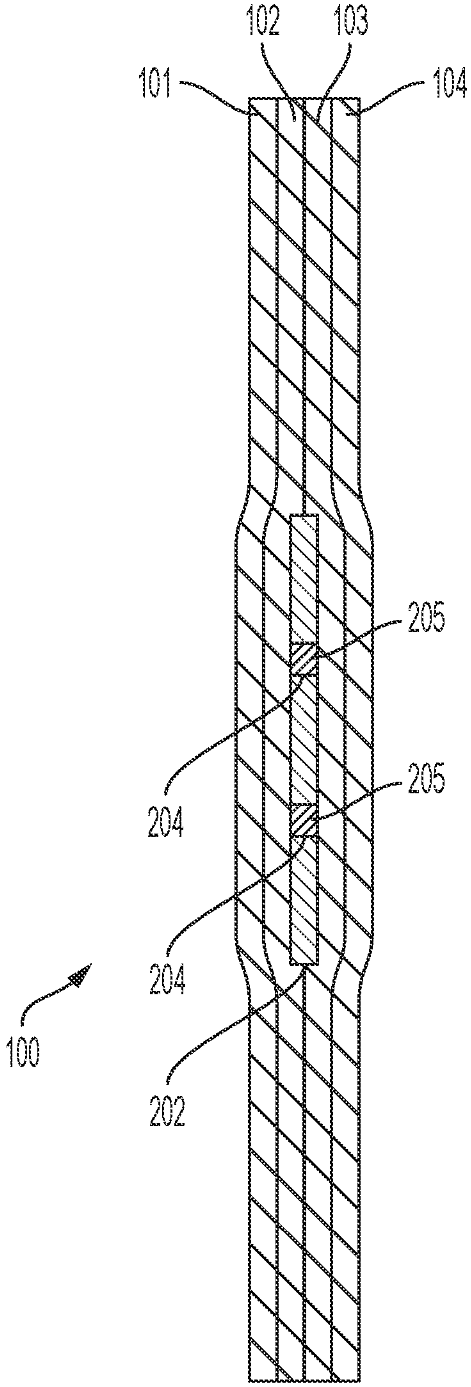

FIG. 3C is a depiction of the system 100 in which the sheets 201, 203 are omitted and the layers 101, 102, 103, 104 in effect serve the same function as the omitted sheets 201, 203. In such an example, some or all of the layers 101, 102, 103, 104 encapsulate the conductor 205 specifically and the bus 200 generally.

Figure 3D:
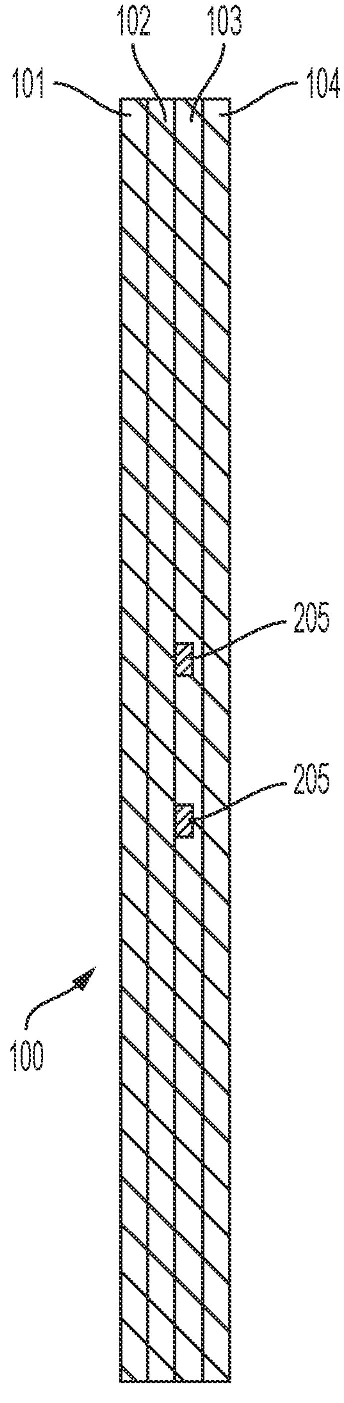

FIG. 3D is a depiction of the system 100 in which the sheets 201, 202, 203 are omitted. In such an example, the conductor 205 is deposited directly on one or both of the layers 102, 103, which are then cured around the conductor 205. Consequently, some or all of the layers 101, 102, 103, 104 encapsulate the conductor 205 specifically and the bus 200 generally.

By way of example, voltage from a constant current source may be applied to one of contacts 212, 213 and voltage measured at the other of contacts 212, 213, and resistance can be calculated, which can be correlated to a strain value for system 100, e.g., when a force is applied to it and it is constrained in a manner that causes, e.g., a deflection. Thus, system 100 is an exemplary embodiment of a structure with an integrated conductor which functions as strain sensor.

In general, when the bus 200 operates as a strain sensor, the bus 200 utilizes the deformable nature of the conductor 205, e.g., the two parallel deformable portions of the conductor 205, each having a length L. A diplexer may include an inductor Ld which provides a DC current path for a sense current Is. The diplexer may also include an AC coupling (DC blocking) capacitor Cd that may prevent the DC current from being coupled elsewhere.

As the strain sensor is stretched, the resistance of the conductor 205 may increase in relation to the amount of stretch. A resistive bridge may sense the change in the resistance by sensing the change in voltage certain locations on the conductor 205 and/or the change in sense current Is, and convert this change in resistance to a change in output voltage Vo. Details of the operation of the strain sensor and circuitry that may be utilized to interpret the output of the strain sensor are disclosed in detail in U.S. Pat. No. 10,672,530, noted above.

Figure 4A:
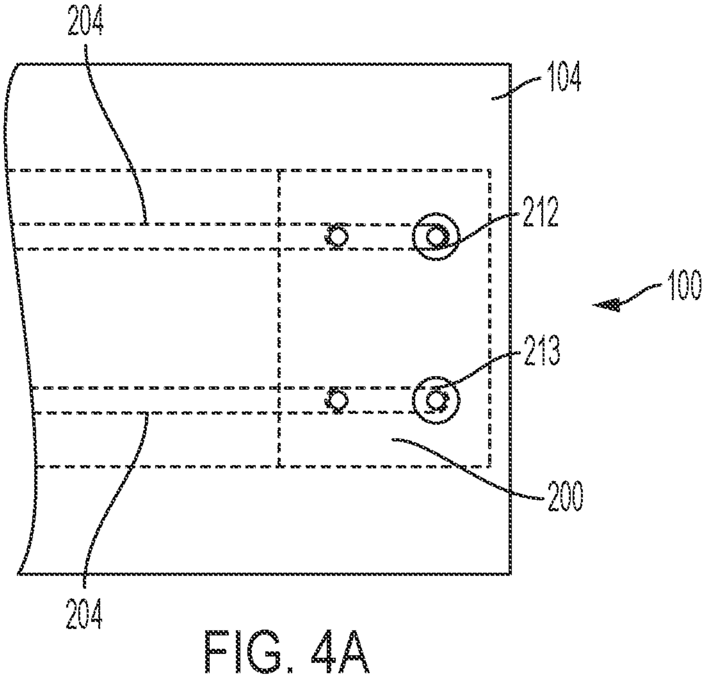
FIGS. 4A and 4B are detailed examples of the bus of the system, in an example embodiment.
Figure 4B:
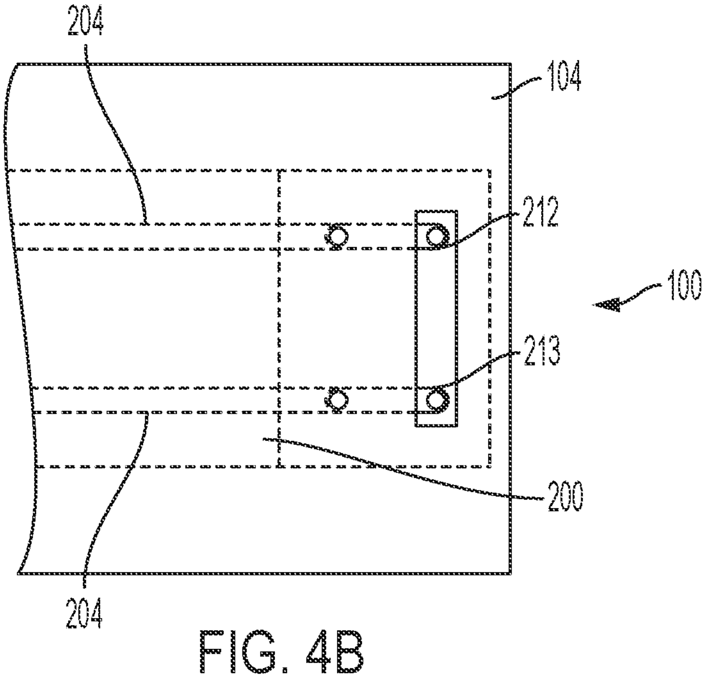

FIGS. 4A and 4B are detailed examples of the bus 200 of the system 100, in an example embodiment. In the examples of FIGS. 4A and 4B, the bus 200 is fully enclosed between the layers 101, 102, 103, 104 and does not stick out beyond the edge of the layers 101, 102, 103, 104, as in the examples of FIGS. 1-3. Consequently, in order to provide physical access to the contacts 213, 214, one or more discrete openings in intervening layers, e.g., the layers 101, 102 or the layers 103, 104, are provided, thereby exposing all or a portion of the contacts 213, 214. As illustrated, FIG. 4A includes two conformal openings 214 generally limited to be as large as may be necessary or desired to provide access to the contacts 212, 213. FIG. 4B includes one large opening 215 sized to provide access to both of the contacts 212, 213.

As may be appreciated, the conductor, e.g., bus 200 above, and/or trace 204 may be configured in a variety of other shapes, geometries, and layouts with additional elements that may permit other functionality, e.g., a capacitive touch sensor, temperature sensor, pressure sensor, and/or an interconnect to provide electrical connectivity from one portion of the system 100 to another portion. In addition, traces may be configured or optimized to function as an antenna. For example, conductor configurations shown and described in U.S. patent application Ser. No. 15/947,744 filed on Apr. 6, 2018 and which is hereby incorporated by reference in its entirety.

Figure 5:
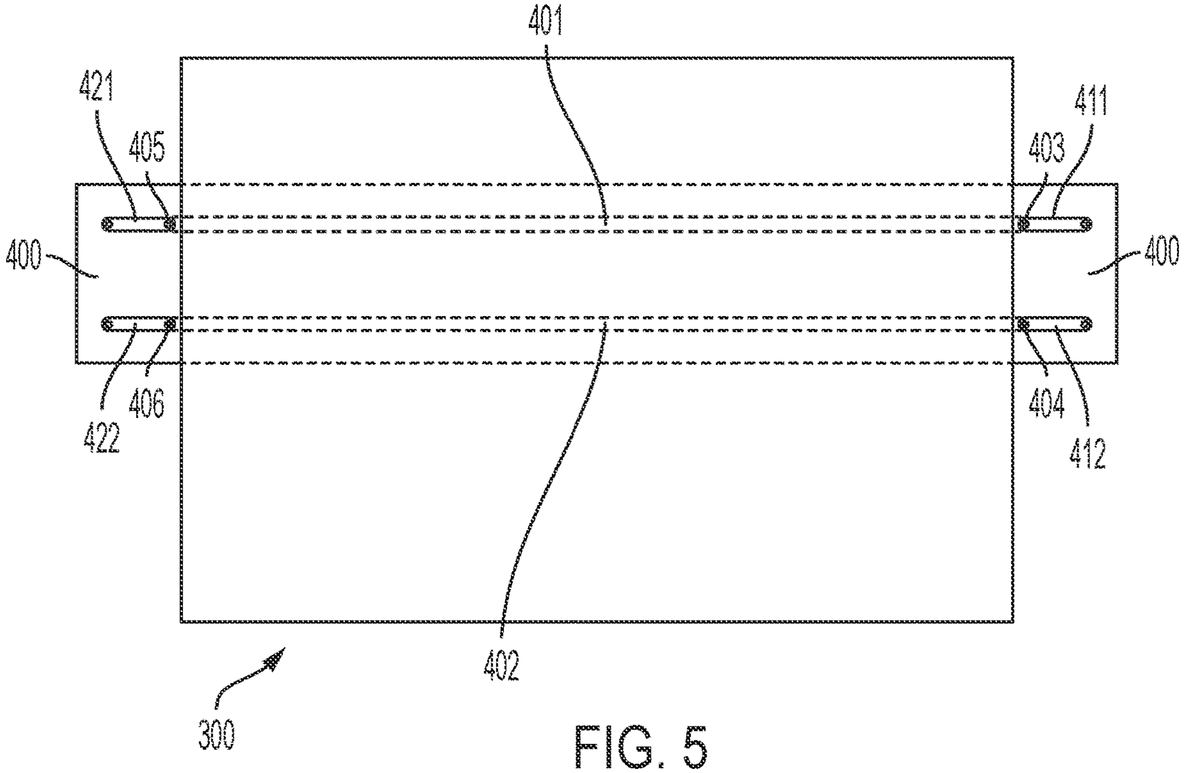
FIG. 5 is a system having a bus including two traces, in an example embodiment.

FIG. 5 is a system 300 having a bus 400 including two traces 401, 402, in an example embodiment. The two traces 401, 402 extend substantially across the entire length of the structure with vias 403, 404, 405, 406 at distal ends of the traces. As illustrated, the bus 400 is an electronic bus extending along the system 300, e.g., to allow an electronic signal to pass from one end of the system 300 to the other, but it is to be recognized and understood that the same principles disclosed with respect to the system 100 may be applied to the system 300 to provide for a sensor.

Conductors 407, 408, such as conductive gel, may be deposited within the traces 401, 402. Two polyimide boards 410 and 420 contain contacts 411, 412, 421, 422, e.g., formed of copper or any other suitable conductor, which are exposed to the outside environment of system 300 in a similar fashion those illustrated with respect to the system 100. Similarly, different configurations may be utilized to expose the contacts 411, 412, 421, 422 to the outside environment. Thus, the system 300 provides for integrated conductors that permit electrical conductivity between each end of the system 300. This may be useful for interconnecting circuits or distributing power or signals to other structures or components (not shown) adjacent, assembled, or connected to system 300. Bus 400 and each of its elements may be manufactured in a similar manner with similar materials as described for the sensor 200.

It should be appreciated the above materials contemplated for bus 200 and bus 400, while exemplary and non-limiting, as a result of their resilience and ability to maintain conductivity in conductors 205 and 407, 408 by virtue of the conductive gel material they comprise, may be applied to structures having a variety of shapes. Therefore, while the structures 100 and 300 are shown having a flat, plate-like shape, alternative solid or thin-shelled structures having cylindrical, conical, spherical, parabolic, irregular or other shapes may be manufactured using the principles described above.

Further, while a specific number of layers comprising a prepreg fiber reinforced sheet have been disclosed, many other methods of enclosing any number of conductors within a matrix material (reinforced or unreinforced) are available and may be adapted. By way of example, a matrix material comprising an uncured polyester resin reinforced with chopped reinforcing fibers may be deposited onto a mold surface, for example using a spray gun, to form a first layer. A sensor or carrier comprising at least one conductor may be deposited onto the first layer, and a second layer of the matrix material may be formed over at least the sensor or carrier to form a structure with an integrated conductor.

Similarly, a sensor or carrier may be insert molded within a structure using a variety of molding techniques (e.g., casting or injection molding) to form a structure with an integrated conductor.

Figure 6:
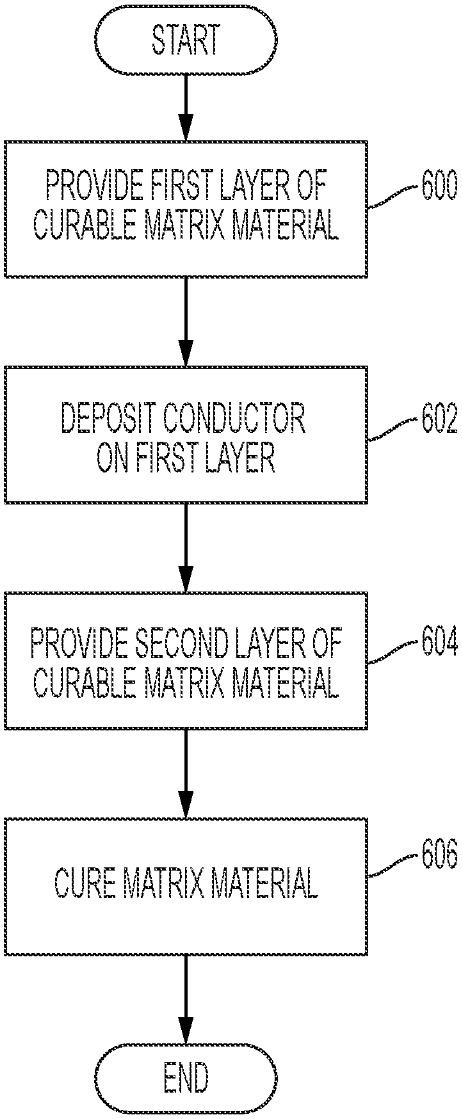
FIG. 6 is a flowchart, in an example embodiment.

FIG. 6 is a flowchart, in an example embodiment. The flowchart may be useful for making either or both of the systems 100, 300 or any other suitable system or structure.

At 600, least a first layer of a curable matrix material that is at least partially uncured is provided.

At 602, a conductor is deposited on the first layer such that the conductor forms at least one trace. In an example, the conductor is deposited onto a carrier and the carrier is deposited onto the first layer such that the carrier comprises the conductor. In an example, the conductor is a conductive gel. In an example, the carrier is a laminate structure comprising at least a first sheet, a second sheet, and the conductor is disposed between the first and second sheets. In an example, the laminate structure further comprises a third sheet having a thickness and an aperture extending completely through the thickness, the aperture having the shape of the trace, the third layer interposed between the first and second layers and the conductor substantially filling the aperture such that it is contained by the first, second, and third sheets. In an example, the carrier comprises at least one sheet of curable material that is in a partially cured state.

At 604, a second layer of the curable matrix material that covers the conductor and encloses the conductor between the first and second layers is provided. In an example, the matrix material of the first and second layers is reinforced with a fiber. In an example, the first and second layers of fiber reinforced matrix material are sheets of fiber material impregnated with the matrix material. In an example, the first and second layers of fiber reinforced matrix material are an uncured resin with fibers dispersed in the resin. In an example, the at least one sheet of curable material is similar to the matrix material.

At 606, the matrix material is cured. In an example, at least one sheet of the curable material.

The electrically conductive compositions, such as conductive gels, comprised in the articles described herein can, for example, have a paste like or gel consistency that can be created by taking advantage of, among other things, the structure that gallium oxide can impart on the compositions when gallium oxide is mixed into a eutectic gallium alloy. When mixed into a eutectic gallium alloy, gallium oxide can form micro or nanostructures that are further described herein, which structures are capable of altering the bulk material properties of the eutectic gallium alloy.

As used herein, the term "eutectic" generally refers to a mixture of two or more phases of a composition that has the lowest melting point, and where the phases simultaneously crystallize from molten solution at this temperature. The ratio of phases to obtain a eutectic is identified by the eutectic point on a phase diagram. One of the features of eutectic alloys is their sharp melting point.

The electrically conductive compositions can be characterized as conducting shear thinning gel compositions. The electrically conductive compositions described herein can also be characterized as compositions having the properties of a Bingham plastic. For example, the electrically conductive compositions can be viscoplastics, such that they are rigid and capable of forming and maintaining three-dimensional features characterized by height and width at low stresses but flow as viscous fluids at high stress. Thus, for example, the electrically conductive compositions can have a viscosity ranging from about 10,000,000 cP to about 40,000,000 cP under low shear and about 150 to 180 at high shear. For example, under condition of low shear the composition has a viscosity of about 10,000,000 cP, about 15,000,000 cP, about 20,000,000 cP, about 25,000,000 cP, about 30,000,000 cP, about 45,000,000 cP, or about 40,000,000 cP under conditions of low shear. Under condition of high shear, the composition has a viscosity of about 150 cP, about 155 cP, about 160 cP, 165 cP, about 170 cP, about 175 cP, or about 180 cP.

The electrically conductive compositions described herein can have any suitable conductivity, such as a conductivity of from about $2\times10^5$ S/m to about $8\times10^5$ S/m.

The electrically conductive compositions described herein can have ay suitable melting point, such as a melting point of from about −20° C. to about 10° C., about −10° C. to about 5° C., about −5° C. to about 5° C. or about −5° C. to about 0° C.

The electrically conductive compositions can comprise a mixture of a eutectic gallium alloy and gallium oxide, wherein the mixture of eutectic gallium alloy and gallium oxide has a weight percentage (wt %) of between about 59.9% and about 99.9% eutectic gallium alloy, such as between about 67% and about 90%, and a wt % of between about 0.1% and about 2.0% gallium oxide such as between about 0.2 and about 1%. For example, the electrically conductive compositions can have about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or greater, such as about 99.9% eutectic gallium alloy, and about 0.1%, about 0.2%, about 0.3%, about 0.4%, about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, and about 2.0% gallium oxide.

The eutectic gallium alloy can include gallium-indium or gallium-indium-tin in any ratio of elements. For example, a eutectic gallium alloy includes gallium and indium. The electrically conductive compositions can have any suitable percentage of gallium by weight in the gallium-indium alloy that is between about 40% and about 95%, such as about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, or about 95%.

The electrically conductive compositions can have a percentage of indium by weight in the gallium-indium alloy that is between about 5% and about 60%, such as about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, or about 60%.

The eutectic gallium alloy can include gallium and tin. For example, the electrically conductive compositions can have a percentage of tin by weight in the alloy that is between about 0.001% and about 50%, such as about 0.001%, about 0.005%, about 0.01%, about 0.05%, about 0.1%, about 0.2%, about 0.3%, about 0.4%, about 0.5%, about 0.6%, about 0.7%, about 0.8%, about 0.9%, about 1%, about 1.5%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, or about 50%.

The electrically conductive compositions can comprise one or more micro-particles or sub-micron scale particles blended with the eutectic gallium alloy and gallium oxide. The particles can be suspended, either coated in eutectic gallium alloy or gallium and encapsulated in gallium oxide or not coated in the previous manner, within eutectic gallium alloy. The micro- or sub-micron scale particles can range in size from nanometer to micrometer and can be suspended in gallium, gallium-indium alloy, or gallium-indium-tin alloy. Particle to alloy ratio can vary and can change the flow properties of the electrically conductive compositions. The micro and nanostructures can be blended within the electrically conductive compositions through sonication or other suitable means. The electrically conductive compositions can include a colloidal suspension of micro and nanostructures within the eutectic gallium alloy/gallium oxide mixture.

The electrically conductive compositions can further include one or more micro-particles or sub-micron scale particles dispersed within the compositions. This can be achieved in any suitable way, including by suspending particles, either coated in eutectic gallium alloy or gallium and encapsulated in gallium oxide or not coated in the previous manner, within the electrically conductive compositions or, specifically, within the eutectic gallium alloy fluid. These particles can range in size from nanometer to micrometer and can be suspended in gallium, gallium-indium alloy, or gallium-indium-tin alloy. Particle to alloy ratio can vary, in order to, among other things, change fluid properties of at least one of the alloys and the electrically conductive compositions. In addition, the addition of any ancillary material to colloidal suspension or eutectic gallium alloy in order to, among other things, enhance or modify its physical, electrical or thermal properties. The distribution of micro and nanostructures within the at least one of the eutectic gallium alloy and the electrically conductive compositions can be achieved through any suitable means, including sonication or other mechanical means without the addition of particles. In certain embodiments, the one or more micro-particles or sub-micron particles are blended with the at least one of the eutectic gallium alloy and the electrically conductive compositions with wt % of between about 0.001% and about 40.0% of micro-particles, for example about 0.001%, about 0.005%, about 0.01%, about 0.05%, about 0.1%, about 0.2%, about 0.3%, about 0.4%, about 0.5%, about 0.6%, about 0.7%, about 0.8%, about 0.9%, about 1%, about 1.5%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, or about 40.

The one or more micro- or sub-micron particles can be made of any suitable material including soda glass, silica, borosilicate glass, quartz, oxidized copper, silver coated copper, non-oxidized copper, tungsten, super saturated tin granules, glass, graphite, silver coated copper, such as silver coated copper spheres, and silver coated copper flakes, copper flakes, or copper spheres, or a combination thereof, or any other material that can be wetted by the at least one of the eutectic gallium alloy and the electrically conductive compositions. The one or more micro-particles or sub-micron scale particles can have any suitable shape, including the shape of spheroids, rods, tubes, a flakes, plates, cubes, prismatic, pyramidal, cages, and dendrimers. The one or more micro-particles or sub-micron scale particles can have any suitable size, including a size range of about 0.5 microns to about 60 microns, as about 0.5 microns, about 0.6 microns, about 0.7 microns, about 0.8 microns, about 0.9 microns, about 1 microns, about 1.5 microns, about 2 microns, about 3 microns, about 4 microns, about 5 microns, about 6 microns, about 7 microns, about 8 microns, about 9 microns, about 10 microns, about 11 microns, about 12 microns, about 13 microns, about 14 microns, about 15 microns, about 16 microns, about 17 microns, about 18 microns, about 19 microns, about 20 microns, about 21 microns, about 22 microns, about 23 microns, about 24 microns, about 25 microns, about 26 microns, about 27 microns, about 28 microns, about 29 microns, about 30 microns, about 31 microns, about 32 microns, about 33 microns, about 34 microns, about 35 microns, about 36 microns, about 37 microns, about 38 microns, about 39 microns, about 40 microns, about 41 microns, about 42 microns, about 43 microns, about 44 microns, about 45 microns, about 46 microns, about 47 microns, about 48 microns, about 49 microns, about 50 microns, about 51 microns, about 52 microns, about 53 microns, about 54 microns, about 55 microns, about 56 microns, about 57 microns, about 58 microns, about 59 microns, or about 60 microns.

The electrically conductive compositions described herein can be made by any suitable method, including a method comprising blending surface oxides formed on a surface of a eutectic gallium alloy into the bulk of the eutectic gallium alloy by shear mixing of the surface oxide/alloy interface. Shear mixing of such compositions can induce a cross linked microstructure in the surface oxides; thereby forming a conducting shear thinning gel composition. A colloidal suspension of micro-structures can be formed within the eutectic gallium alloy/gallium oxide mixture, for example as, gallium oxide particles and/or sheets.

The surface oxides can be blended in any suitable ratio, such as at a ratio of between about 59.9% (by weight) and about 99.9% eutectic gallium alloy, to about 0.1% (by weight) and about 2.0% gallium oxide. For example percentage by weight of gallium alloy blended with gallium oxide is about 60%, 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or greater, such as about 99.9% eutectic gallium alloy while the weight percentage of gallium oxide is about 0.1%, about 0.2%, about 0.3%, about 0.4%, about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, and about 2.0% gallium oxide. In embodiments, the eutectic gallium alloy can include gallium-indium or gallium-indium-tin in any ratio of the recited elements. For example, a eutectic gallium alloy can include gallium and indium.

The weight percentage of gallium in the gallium-indium alloy can be between about 40% and about 95%, such as about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, or about 95%.

Alternatively or in addition, the weight percentage of indium in the gallium-indium alloy can be between about 5% and about 60%, such as about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, or about 60%.

A eutectic gallium alloy can include gallium, indium, and tin. The weight percentage of tin in the gallium-indium-tin alloy can be between about 0.001% and about 50%, such as about 0.001%, about 0.005%, about 0.01%, about 0.05%, about 0.1%, about 0.2%, about 0.3%, about 0.4%, about 0.5%, about 0.6%, about 0.7%, about 0.8%, about 0.9%, about 1%, about 1.5%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, or about 50%.

The weight percentage of gallium in the gallium-indium-tin alloy can be between about 40% and about 95%, such as about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, or about 95%.

Alternatively or in addition, the weight percentage of indium in the gallium-indium-tin alloy can be between about 5% and about 60%, such as about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, or about 60%.

One or more micro-particles or sub-micron scale particles can be blended with the eutectic gallium alloy and gallium oxide. For example, the one or more micro-particles or sub-micron particles can be blended with the mixture with wt % of between about 0.001% and about 40.0% of micro-particles in the composition, for example about 0.001%, about 0.005%, about 0.01%, about 0.05%, about 0.1%, about 0.2%, about 0.3%, about 0.4%, about 0.5%, about 0.6%, about 0.7%, about 0.8%, about 0.9%, about 1%, about 1.5%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, or about 40. In embodiments the particles can be soda glass, silica, borosilicate glass, quartz, oxidized copper, silver coated copper, non-oxidized copper, tungsten, super saturated tin granules, glass, graphite, silver coated copper, such as silver coated copper spheres, and silver coated copper flakes, copper flakes or copper spheres or a combination thereof, or any other material that can be wetted by gallium. In some embodiments the one or more micro-particles or sub-micron scale particles are in the shape of spheroids, rods, tubes, a flakes, plates, cubes, prismatic, pyramidal, cages, and dendrimers. In certain embodiments, the one or more micro-particles or sub-micron scale particles are in the size range of about 0.5 microns to about 60 microns, as about 0.5 microns, about 0.6 microns, about 0.7 microns, about 0.8 microns, about 0.9 microns, about 1 microns, about 1.5 microns, about 2 microns, about 3 microns, about 4 microns, about 5 microns, about 6 microns, about 7 microns, about 8 microns, about 9 microns, about 10 microns, about 11 microns, about 12 microns, about 13 microns, about 14 microns, about 15 microns, about 16 microns, about 17 microns, about 18 microns, about 19 microns, about 20 microns, about 21 microns, about 22 microns, about 23 microns, about 24 microns, about 25 microns, about 26 microns, about 27 microns, about 28 microns, about 29 microns, about 30 microns, about 31 microns, about 32 microns, about 33 microns, about 34 microns, about 35 microns, about 36 microns, about 37 microns, about 38 microns, about 39 microns, about 40 microns, about 41 microns, about 42 microns, about 43 microns, about 44 microns, about 45 microns, about 46 microns, about 47 microns, about 48 microns, about 49 microns, about 50 microns, about 51 microns, about 52 microns, about 53 microns, about 54 microns, about 55 microns, about 56 microns, about 57 microns, about 58 microns, about 59 microns, or about 60 microns.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data." "content," "bits," "values," "elements," "symbols," "characters," "terms," "numbers." "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

EXAMPLES

Example 1 is a system, comprising: a structure formed from a plurality of layers of matrix material; a bus, secured between adjacent layers of the plurality of layers of the matrix material, comprising a conductive gel configured to propagate an electrical signal through the structure.

In Example 2, the subject matter of Example 1 includes, wherein the bus is encapsulated, at least in part, by the matrix material.

In Example 3, the subject matter of any one or more of Examples 1 and 2 includes, wherein the conductive gel is in contact with the adjacent layers of the matrix material.

In Example 4, the subject matter of any one or more of Examples 1-3 includes, wherein the bus further comprises resin which encapsulates the conductive gel.

In Example 5, the subject matter of any one or more of Examples 1-4 includes, wherein the resin forms a trace containing the conductive gel.

In Example 6, the subject matter of any one or more of Examples 1-5 includes, wherein the resin forms a sheet.

In Example 7, the subject matter of any one or more of Examples 1-6 includes, wherein the adjacent layers of the matrix material are in contact with the sheet.

In Example 8, the subject matter of any one or more of Examples 1-7 includes, wherein the resin forms a plurality of sheets configured to encapsulate the conductive gel.

In Example 9, the subject matter of any one or more of Examples 1-8 includes, wherein the adjacent layers of the matrix material are in contact with at least two of the plurality of sheets.

In Example 10, the subject matter of Examples 1-9 includes, wherein the bus further comprises contacts electrically coupled to the conductive gel, wherein the contacts are exposed to an environment exterior to the structure.

In Example 11, the subject matter of any one or more of Examples 1-10 includes, wherein bus further comprises a board, the contacts included on the board, and wherein the board extends, at least in part, outside of the structure.

In Example 12, the subject matter of any one or more of Examples 1-11 includes, wherein the contacts are exposed to the environment exterior to the structure by way of at least one hole formed in the matrix material of the structure.

In Example 13, the subject matter of any one or more of Examples 1-12 includes, wherein the bus is a sensor configured to determine a condition of the structure.

In Example 14, the subject matter of any one or more of Examples 1-13 includes, wherein the condition of the structure is one selected from the group consisting of a temperature change, contact with another body, an applied force, a magnetic field, and an electrical field.

Example 15 is a method of manufacturing a structure comprising the steps of: providing at least a first layer of a curable matrix material that is at least partially uncured; depositing a conductor on the first layer such that the conductor forms at least one trace; providing a second layer of the curable matrix material that covers the conductor and encloses the conductor between the first and second layers; and curing the matrix material.

In Example 16, the subject matter of Example 15 includes, wherein the step of depositing a conductor on the first layer includes depositing the conductor onto a carrier and depositing the carrier onto the first layer such that the carrier comprises the conductor.

In Example 17, the subject matter of any one or more of Examples 15 and 16 includes, wherein the conductor comprises a conductive gel.

In Example 18, the subject matter of any one or more of Examples 15-17 includes, wherein the matrix material of the first and second layers is reinforced with a fiber.

In Example 19, the subject matter of any one or more of Examples 15-18 includes, wherein the first and second layers of fiber reinforced matrix material are sheets of fiber material impregnated with the matrix material.

In Example 20, the subject matter of any one or more of Examples 15-19 includes, wherein the first and second layers of fiber reinforced matrix material are an uncured resin with fibers dispersed in the resin.

In Example 21, the subject matter of any one or more of Examples 15-20 includes, wherein the carrier is a laminate structure comprising at least a first sheet, a second sheet, and the conductor is disposed between the first and second sheets.

In Example 22, the subject matter of any one or more of Examples 15-21 includes, wherein the laminate structure further comprises a third sheet having a thickness and an aperture extending completely through the thickness, the aperture having the shape of the trace, the third layer interposed between the first and second layers and the conductor substantially filling the aperture such that it is contained by the first, second, and third sheets.

In Example 23, the subject matter of any one or more of Examples 15-22 includes, wherein the carrier comprises at least one sheet of curable material that is in a partially cured state.

In Example 24, the subject matter of any one or more of Examples 15-23 includes, wherein the at least one sheet of curable material is similar to the matrix material.

In Example 25, the subject matter of any one or more of Examples 15-24 includes, wherein the step of curing the matrix material includes curing the at least one sheet of curable material.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

Since the inventive principles of this patent disclosure can be modified in arrangement and detail without departing from the inventive concepts, such changes and modifications are considered to fall within the scope of the following claims.

What is claimed is:

1. A method of manufacturing a molded article, comprising the steps of:
   - forming a bus from a first material and a conductor, wherein forming the bus includes depositing the conductor on a sheet made from the first material;
   - placing the bus in a mold; and
   - surrounding at least a portion of the bus with a second material within the mold, the second material being a matrix material in an uncured state;
   - curing the second material to cause the first material to bond with the second material and encapsulate, at least in part, the bus within the second material.

2. The method of claim 1, wherein the conductor comprises a conductive gel.

3. The method of claim 2, wherein the first material and the second material are substantially similar.

4. The method of claim 3, wherein the bus comprises at least one sheet of curable material that is in a partially cured state.

5. The method of claim 4, wherein the at least one sheet of curable material is the first material.

6. The method of claim 5, wherein the step of curing the matrix material includes curing the at least one sheet of curable material.

7. The method of claim 1, wherein the bus is a laminate structure comprising at least a first sheet, a second sheet, and the conductor is disposed between the first and second sheets and forms a trace.

8. The method of claim 7, wherein the step of forming the bus includes attaching an electric component to a surface of the bus, and electrically connecting the electric component to the trace.

9. The method of claim 8, wherein the laminate structure further comprises a third sheet having a thickness and an aperture extending completely through the thickness, the aperture having the shape of the trace, the third layer interposed between the first and second layers and the conductor substantially filling the aperture such that it is contained by the first, second, and third sheets.

10. A molded article, comprising:
   - a bus, comprising:
     - a first material; and
     - a conductor;
   - a second material encapsulating at least a portion of the bus, the second material being a matrix material molded over the bus and bonded with the first material; and
   - wherein the bus is a laminate structure comprising at least a first sheet, a second sheet, and the conductor is disposed between the first and second sheets.

11. The molded article of claim 10, wherein the conductor is disposed on the first material.

12. The molded article of claim 10, wherein the conductor comprises a conductive gel.

13. The molded article of claim 10, wherein the first material is a cured matrix material.

14. The molded article of claim 13, wherein the first material and the second material are substantially similar.

15. The molded article of claim 14, wherein the bus comprises at least one sheet of cured matrix material.

16. The molded article of claim 15, wherein the at least one sheet of cured matrix material is the first material.

17. The molded article of claim 15, wherein an electric component is attached to the bus and electrically connected to the conductor.

18. The molded article of claim 10, wherein the laminate structure further comprises a third sheet having a thickness and an aperture extending completely through the thickness, the aperture having the shape of the trace, the third layer interposed between the first and second layers and the conductor substantially filling the aperture such that it is contained by the first, second, and third sheets.

19. The method of claim 1, wherein the conductor comprises a fluid phase conductive material.

20. The molded article of claim 10, wherein the conductor comprises a fluid phase conductive material.

* * * * *